March 19, 1963 R. J. WILLIAMS ETAL 3,081,463
MOTOR OPERATED HOSPITAL BED
Filed April 2, 1959 10 Sheets-Sheet 5

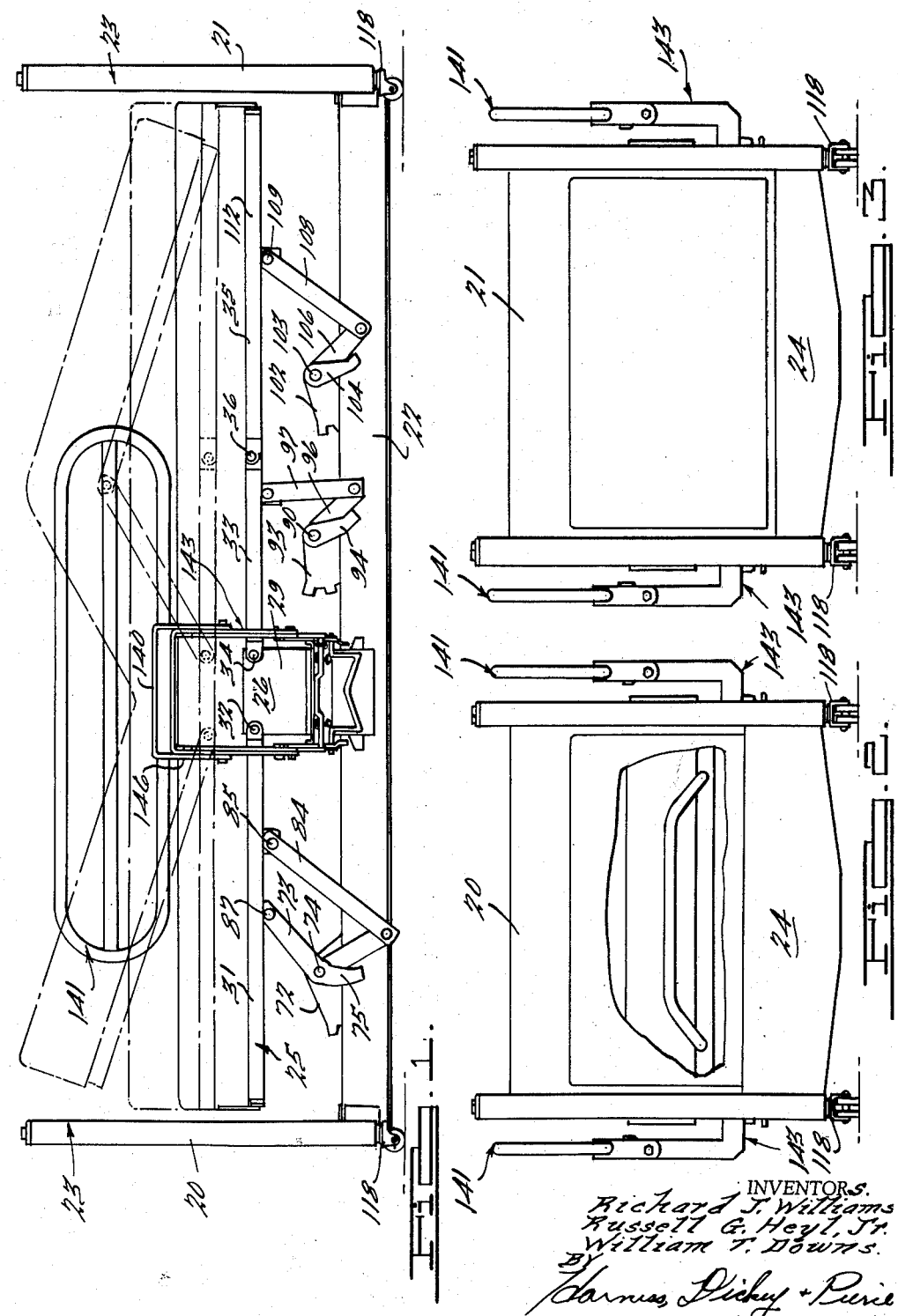

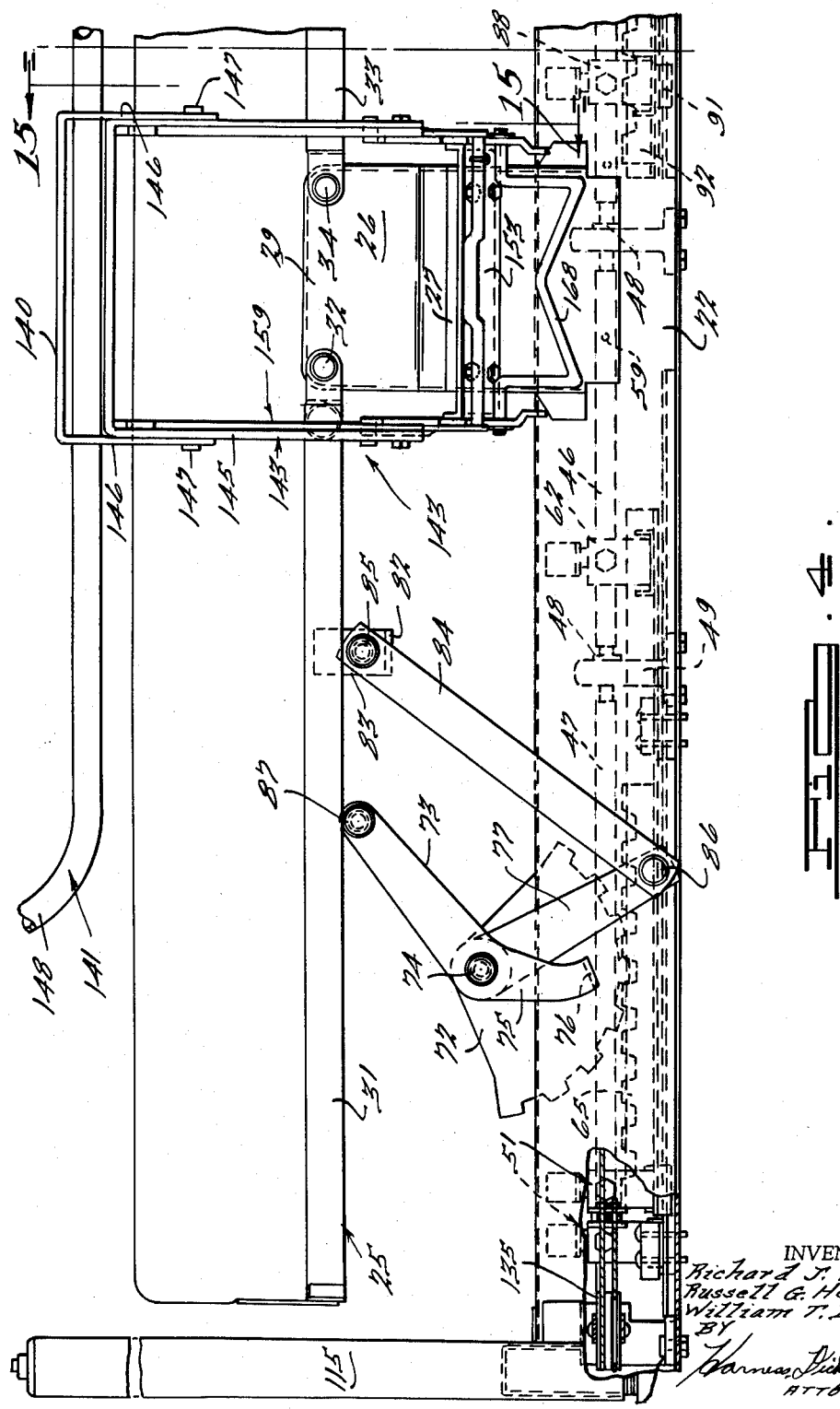

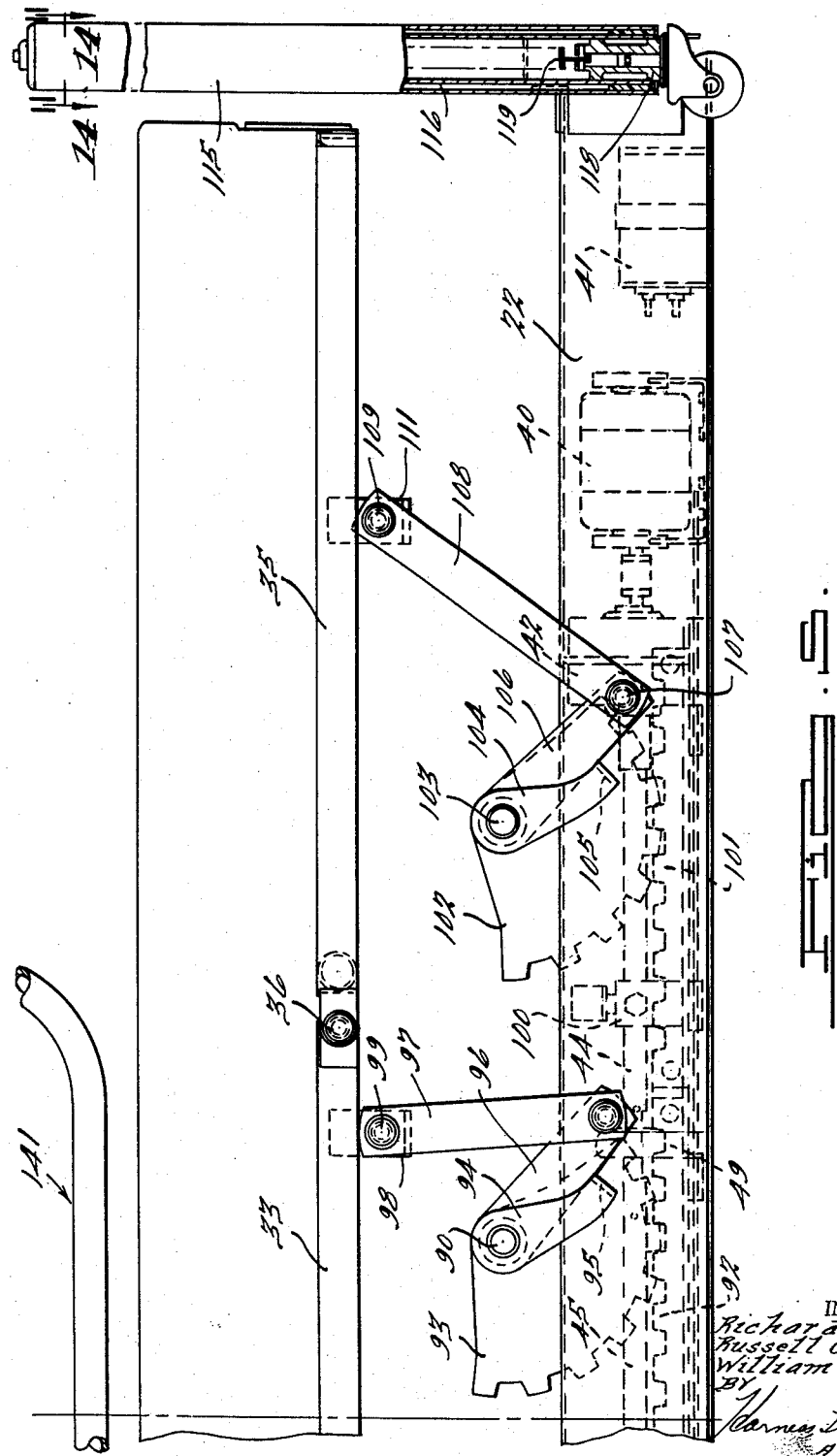

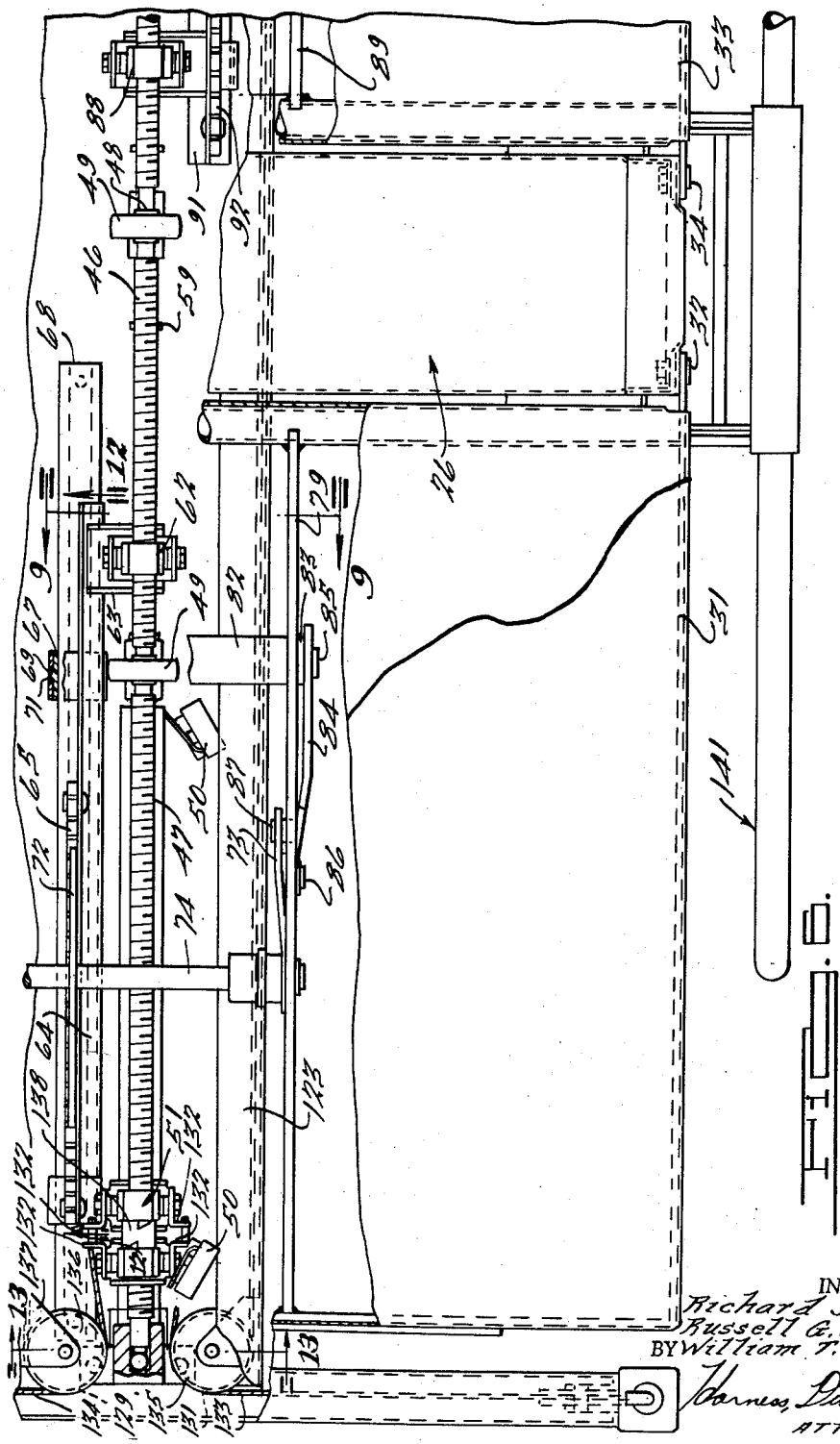

INVENTORS.
Richard J. Williams
Russell G. Hoyt, Jr.
BY William T. Downs.

ATTORNEYS.

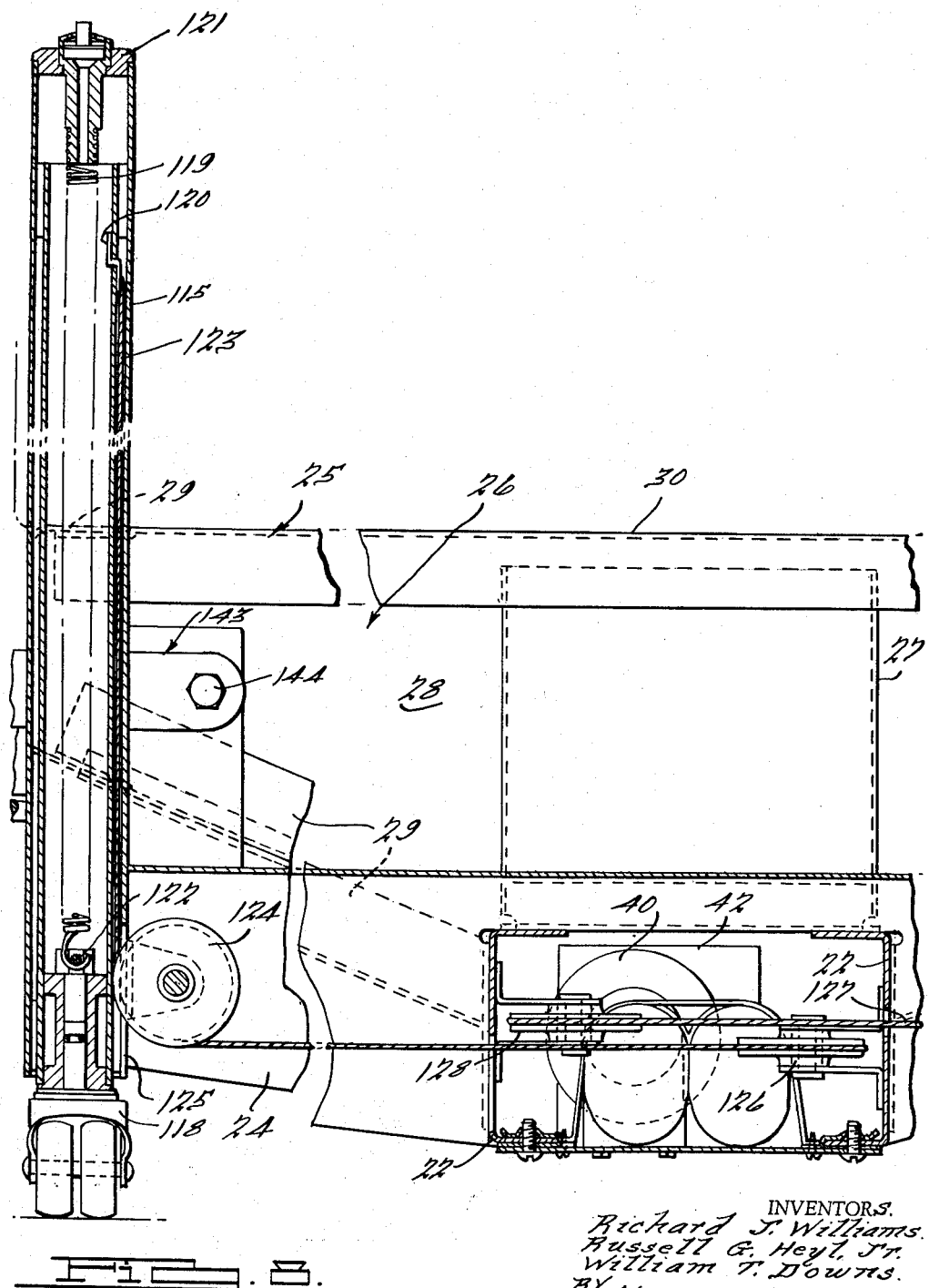

March 19, 1963 R. J. WILLIAMS ETAL 3,081,463
MOTOR OPERATED HOSPITAL BED
Filed April 2, 1959 10 Sheets-Sheet 7
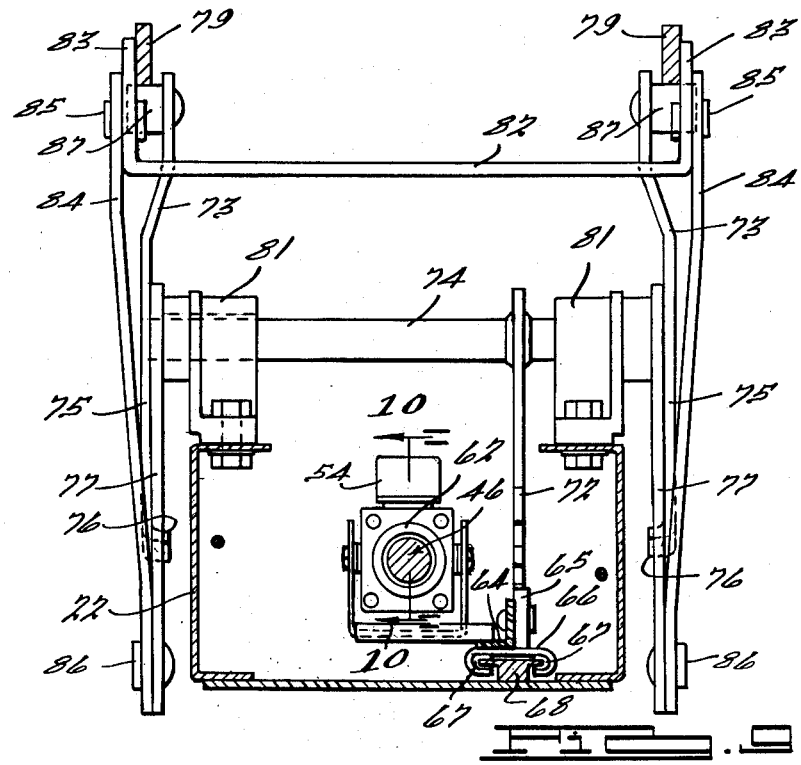
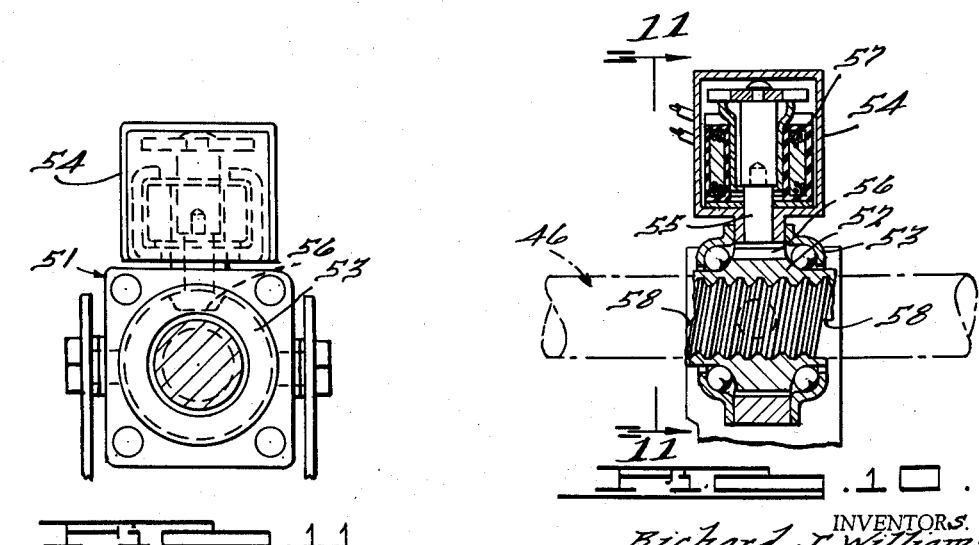
INVENTORS.
Richard J. Williams
Russell G. Heyl, Jr.
BY William T. Downs.
Harness, Dickey & Pierce
ATTORNEYS.

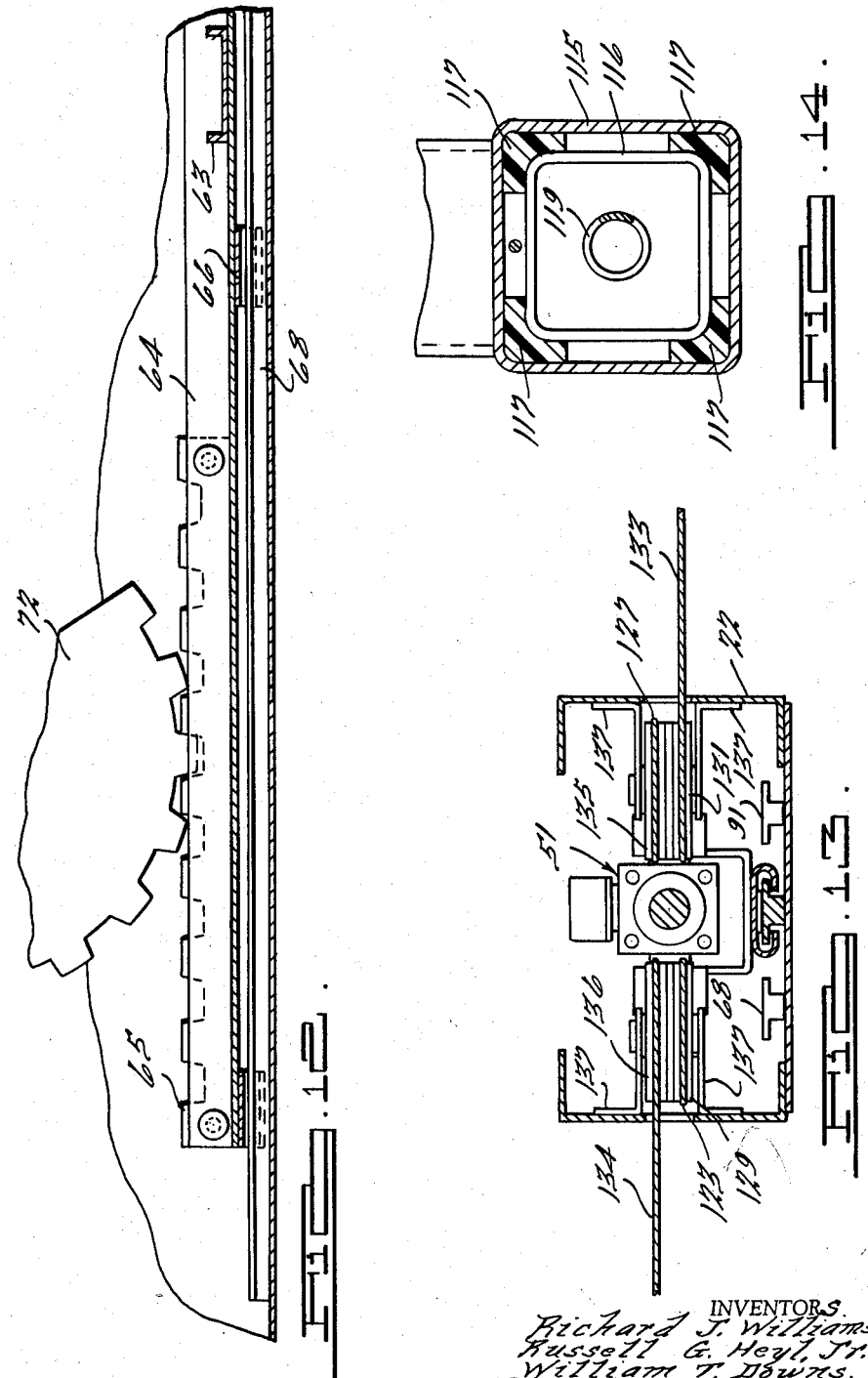

March 19, 1963 R. J. WILLIAMS ETAL 3,081,463
MOTOR OPERATED HOSPITAL BED
Filed April 2, 1959 10 Sheets-Sheet 9
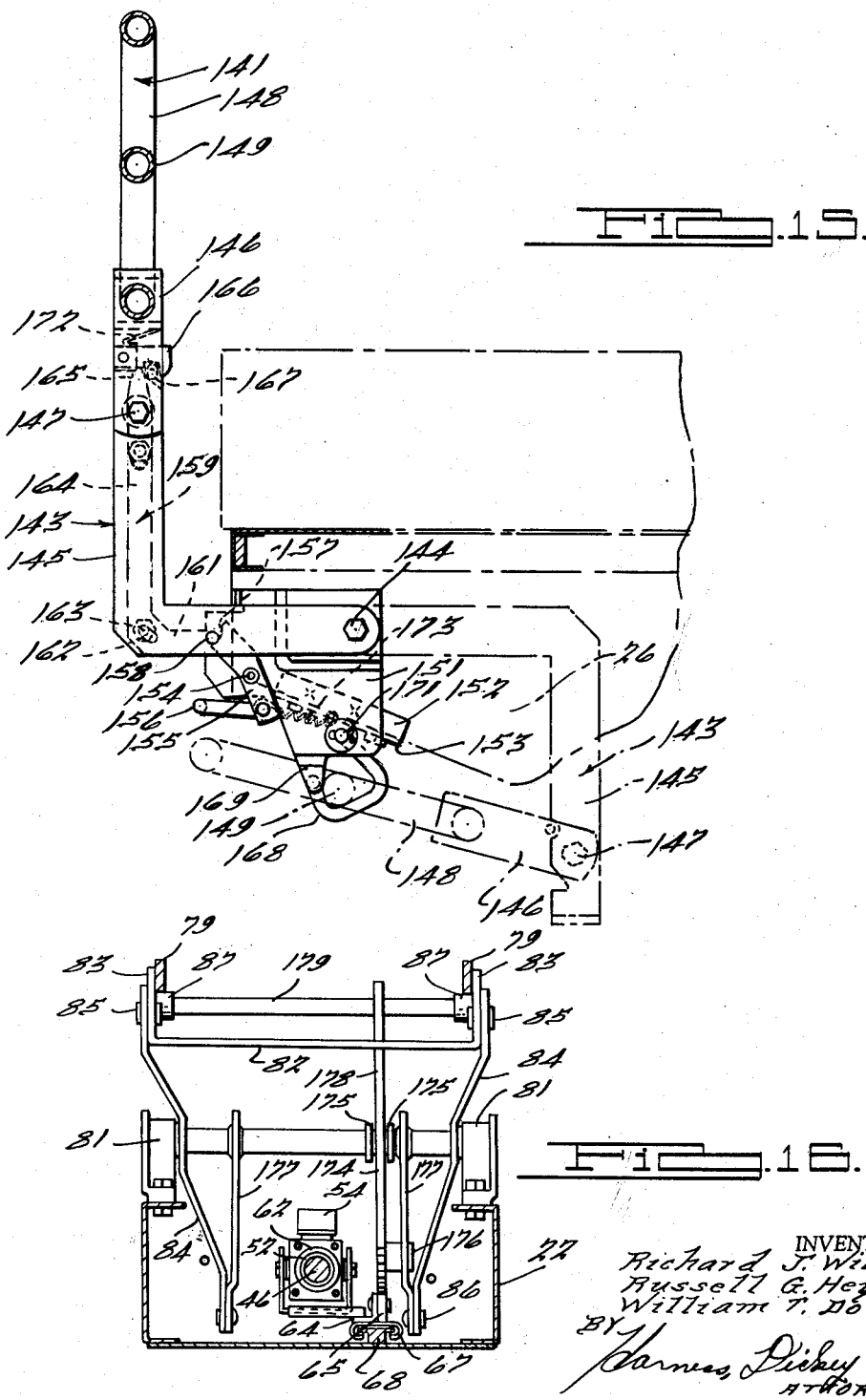

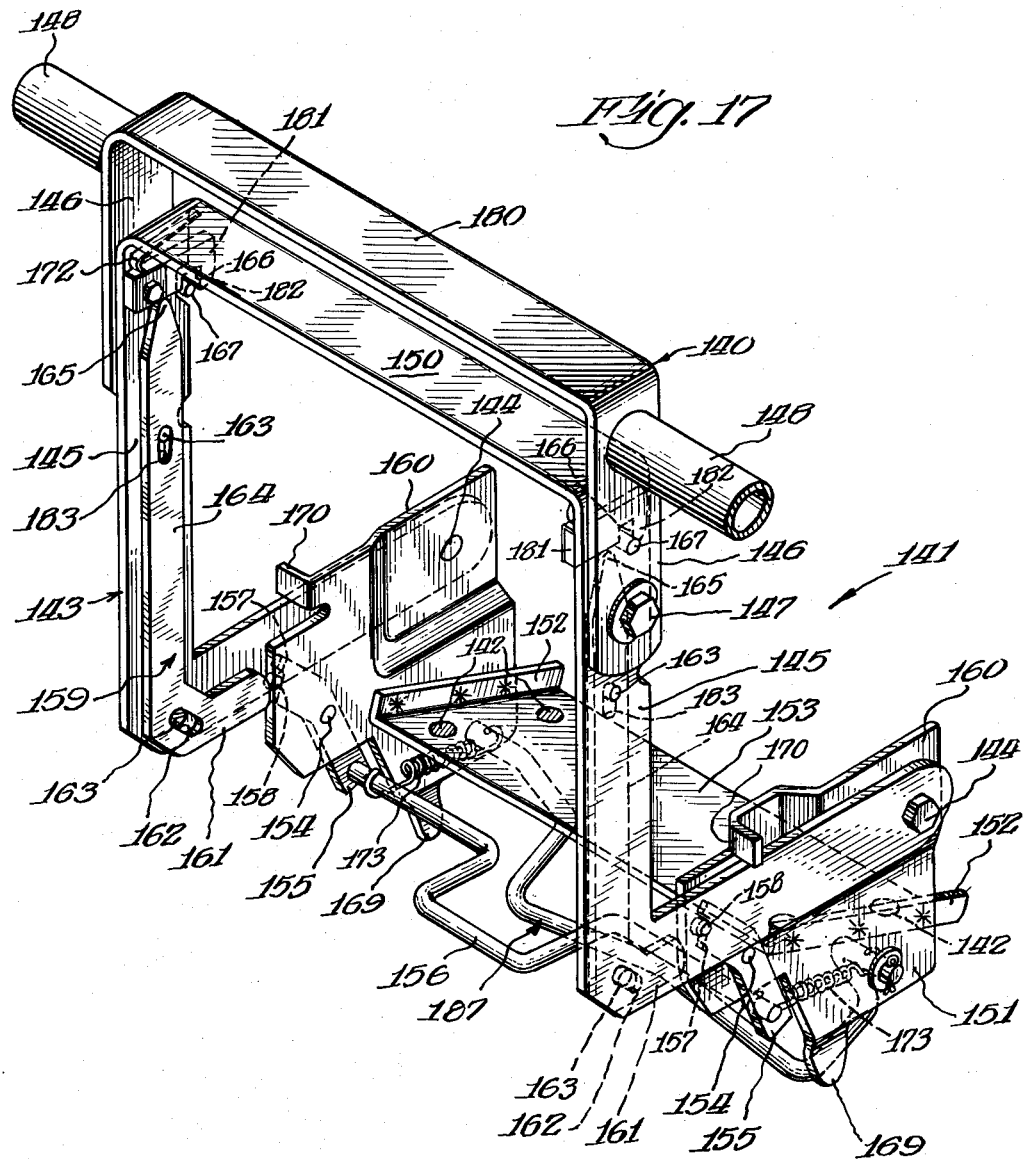

United States Patent Office 3,081,463
Patented Mar. 19, 1963

3,081,463
MOTOR OPERATED HOSPITAL BED
Richard J. Williams and Russell G. Heyl, Jr., Birmingham, and William T. Downs, Detroit, Mich., assignors, by mesne assignments, to Simmons Company, New York, N.Y., a corporation of Delaware
Filed Apr. 2, 1959, Ser. No. 803,714
10 Claims. (Cl. 5—63)

This invention relates to adjustable beds, and particularly to an adjustable bed of the hospital type which is power driven to various positions at the control of the occupant.

Beds of the hospital type have been adjustable in height and to various tilted positions manually. This required operation by someone other than the patient or occupant of the bed so that adjustment could only occur when such a person was present. The degree of tilt and raising and lowering of the platform of the bed was limited and only a minimum amount and number of adjustments were made.

In the illustrated embodiment of the hospital type of bed of the present invention, a body-supporting platform is provided consisting of an intermediate fixed portion, an angular raisable back portion, and an angularly adjustable thigh portion from which an angularly adjustable leg portion extends. The back, thigh and the leg portions are all adjustable relative to each other and the entire platform is adjustable upwardly or downwardly for removing the patient to or from a low ambulance cot or for working over a patient at a height conforming to the stature of the nurse or the doctor in attendance. Sections of the platform are supported on upwardly and downwardly movable supporting elements which are pivotally secured to an underframe including a centrally disposed channel shaped support interconnecting the end frames of the bed. A lead screw is driven through a gear reduction unit by a motor, the lead screw having a plurality of nuts thereon which are interengaged when an associated solenoid is energized for selectively advancing one or more of the nuts along the lead screw. The movement of a nut moves a rack plate along therewith, having apertures which engage teeth of a sector on a shaft which rotates the shaft through a predetermined angle for operating a link to thereby adjust the three angularly shiftable elements of the bed to a desired position. By energizing any one or all of the solenoids through a portable switching box, one or all of the nuts are retained against rotation so as to be driven along the lead screw to thereby change the position of the elements of the bed.

Each end frame has two telescoping square-shaped tubular standards, the inner one having a caster on the bottom and a cable connected to the top which passes under a sheave secured to the outer tubular element of the leg. The other tubular elements of each of the boards have interconnecting panels, the lower ones or portion of which support the central channel support having the driving element therein. The cables from the outer four legs are secured to a pair of nuts at the head end of the bed which are secured together to operate in unison to withstand the load so that all four cables are pulled along the lead screw at the same time to the end board simultaneously. The two interconnected nuts which operate in unison withstand the weight of the entire bed and occupant, thereby permitting all of the nuts and associated solenoids to be the same. A side rail is mounted at each side of the bed on the central bolster extending thereacross, the rail being mounted on an angular arm which folds together and swings beneath the bed latch to the under side of the bolster completely out of the way when not in use. Each section of the platform of the bed is made from stainless steel or other rustproof material on which a foam rubber pad is supported which permits the angular movement of the different sections of the platform and provides a firm support for the bed occupant.

Accordingly, the main objects of the invention are: to provide a hospital type bed with a platform section which is raisable and lowerable relative to the supporting frame; to mount a driving mechanism in a box structure which extends between the headboard and footboard of the bed frame which embodies a lead screw, a driving motor, and selectively operable nuts movable along the lead screw; to provide an adjustable type of bed with means for raising and lowering the platform and for tilting the back, thigh and leg sections of the platform to any desirable angle in any vertically adjusted position thereof; to provide a bed having means operated through the actuation of suitable switches in a portable switch box for adjusting sections of the bed platform to various angular positions and for raising and lowering the platform; to provide retractable frame members at the sides of the platform which are carried therewith and which may be collapsed and secured therebeneath, and, in general, to provide a hospital type of bed that is power operated which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a side view in elevation of a bed embodying features of the present invention;

FIG. 2 is a view of the bed from the head end thereof;

FIG. 3 is a view of the bed from the foot end thereof;

FIG. 4 is an enlarged side view of the bed illustrated in FIG. 1, showing the head half thereof;

FIG. 5 is an enlarged side view of the bed illustrated in FIG. 1, showing the foot half thereof;

FIG. 6 is a broken plan view of the head end of the bed illustrated in FIG. 4;

FIG. 8 is an enlarged sectional view of the structure illustrated in FIG. 7, taken on the line 8—8 thereof;

FIG. 9 is an enlarged sectional view of the structure illustrated in FIG. 6, taken on the line 9—9 thereof;

FIG. 10 is an enlarged sectional view of the structure illustrated in FIG. 9, taken on the line 10—10 thereof;

FIG. 11 is a sectional view of the structure illustrated in FIG. 10, taken on the line 11—11 thereof;

FIG. 12 is a sectional view of the structure illustrated in FIG. 6, taken on the line 12—12 thereof;

FIG. 13 is an enlarged sectional view of the structure illustrated in FIG. 6, taken on the line 13—13 thereof;

FIG. 14 is an enlarged sectional view of the structure illustrated in FIG. 5, taken on the line 14—14 thereof;

FIG. 15 is an enlarged sectional view of the structure illustrated in FIG. 4, taken on the line 15—15 thereof;

FIG. 16 is a view of structure, similar to that in FIG. 9, showing a further form of the invention; and FIG. 17 is an isometric view of the safety-side rail mounted on the bed at each side thereof.

Figure 7:
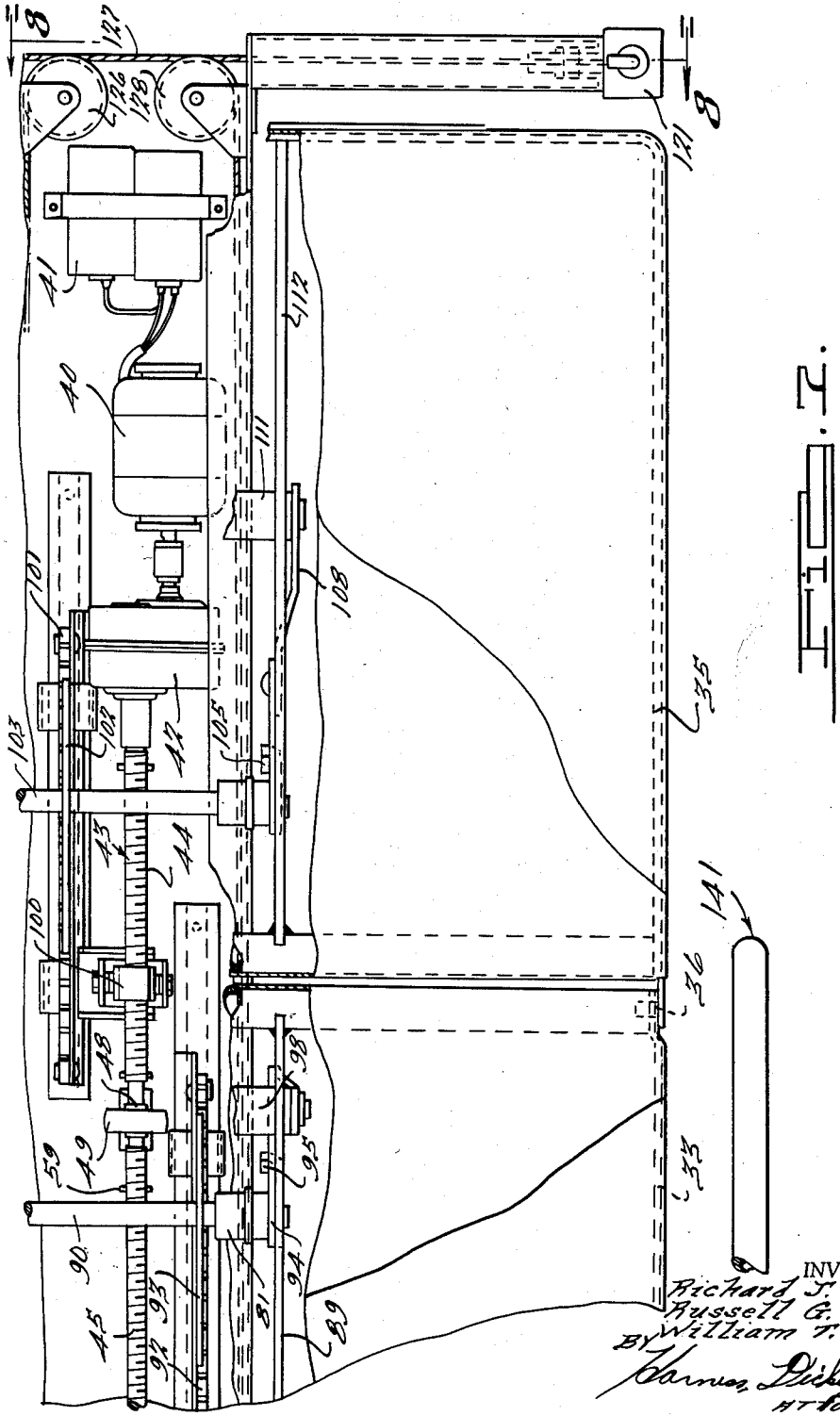
FIG. 7 is a broken plan view of the foot end of the bed illustrated in FIG. 5.

The bed has head and foot end frames 20 and 21, interconnected by a longitudinally extending, centrally disposed box section girder member 22 of upwardly open channel construction. The end frames have telescoping corner posts 23 which are interconnected by laterally disposed cross members 24 to the central portion of which the ends of the girder member 22 are secured. The four corner posts, the bottom cross members 24 and the central box shaped girder member 22 form the entire supports for the platform 25 of the bed. The girder 22 has mounted thereon a bolster or cross arm 26 which extends sidewardly from the girder and provides a point of attachment for certain of the sections of the platform 25, and which, in the illustrated form, constitutes an intermediate fixed part of the platform. From the drawings it will be seen that the girder is of a width less than that of the body-supporting platform 25, and that the platform extends sidewardly beyond the girder at both sides of the bed. The bolster has a top stamping 30 supported on a central tubular element 27 extending upwardly from the girder member 22 reinforced at the forward and rearward faces by the plates 28 which have bottom edges which slope upwardly from the box section girder member 22. The bottom and end edges of the plates 28 are enclosed by a channel-shaped stamping 29 which extend outwardly and upwardly from the girder member, as illustrated in FIG. 8. A back rest platform section 31 is secured to the bolster 26 by the pivots 32. The adjustable thigh section 33 of the platform 25 is secured to the bolster 26 by the pivots 34. The adjustable leg section 35 of the platform is secured to the thigh section 33 by the pivots 36. Each platform section is composed of a frame over which a thin sheet of stainless steel or other stainless material is secured.

The elevating mechanism for raising and lowering the platform and for tilting the back, the thigh and leg sections thereof is mounted within the box section structure of the girder member 22. Beneath the leg section 35 and within the girder member 22, a motor 40 is supported in fixed position constructed to be driven in forward and reverse direction through the relays 41. The motor drives through a gear reduction unit 42 to drive a lead screw 43 which is divided into four sections 44, 45, 46 and 47. Between each section a bearing 48 is provided on a standard 49 which is secured to the bottom of the box section girder member 22. Like nut mechanisms 51, 62, 88 and 100 are mounted on each of the lead screw sections. Two of the nuts 51 are unitized on the section 47, as illustrated in FIG. 4, for a purpose which will be explained hereinafter.

Each nut mechanism, as illustrated in FIGS. 10 and 11, comprises a nut 52 retained in a bearing housing 53 for rotation relative thereto on a plurality of balls. The housing has a solenoid mechanism 54 mounted thereon containing a plunger 55 which is moved into a cam groove 56 in the nut by the flux from a coil 57 when energized. The nut will normally rotate with the shaft but will be retained against rotation by the plunger 55 when the circuit to the solenoid 57 is energized. This causes the nut to move along the lead screw in a direction conforming to the direction of rotation of the motor 40. The nut can continue to travel along the lead screw until one of the projections 58 thereof strikes a pin 59 provided through the lead screw at each end of the sections 44, 45 and 46.

The mechanism for raising the head section of the platform is illustrated more specifically in FIGS. 6 and 9. The nut mechanism 62 on the section 46 of the lead screw is connected by a stamping 63 to a slide member 64 which carries a rack 65. The slide member is supported on downwardly presenting U-shaped slide brackets 66 which engage low friction plastic elements 67 on a T-head track member 68. Notches 69 in the brackets 66 engage projections 71 on the low friction elements 67 for retaining the elements fixed to the bracket 66 to move therewith. The movement of the nut moves the rack 65 which rotates a sector 72 through the engagement of the teeth thereof with the teeth of the rack 65. An arm 73 is secured at each end of a cross shaft 74 to which the sector 72 is secured. Each arm 73 has a downwardly extending portion 75 having an inwardly extending flange 76 on the end in position to engage an arm 77 which is freely rotatable on the shaft. The frame of the head platform section 31 has a pair of additional frame elements 79 spaced from each other along the central portion thereof above the side walls of the girder member 22. The shaft 74 is journaled in bearing elements 81 which are bolted to the top of the girder member 22. The pair of frame members 79 is interconnected by a channel-shaped brace 82 to the vertical end portions 83 of which links 84 are secured by pivots 85, the opposite end of the link 84 being connected to the floating arms 77 by a pivot 86. When the nut 52 of an assembly 62 on the lead screw section 46 is retained against rotation, it will move along the lead screw in the forward or rearward direction, depending upon the direction of rotation of the motor 40. When the nut is advanced toward the foot of the bed, the sector 72 is rotated in a counterclockwise direction, causing the arm 73 and its extension 75 to similarly rotate in a counterclockwise direction, causing the roller 87 on the end of the arm to roll along the reinforcing frame elements 79 to begin raising the back rest. This will continue until the flange 76 strikes the arm 77, whereupon the arm will be moved in a counterclockwise direction, causing the link 84 to apply a force to the frame element 79 and to thereby more rapidly raise the back rest, separating the rail element 79 from the roller 87 at a point where the load has substantially reduced.

As illustrated in FIGS. 5, 6 and 7, the thigh section 33 of the bed is operated by the nut 52 of the nut mechanism 88 which moves a slide 91 and a rack 92 secured thereto. The rack operates a sector 93 to rotate an arm 94 on a cross shaft 90 supported in the bearings 81 until a flange 95 thereof strikes a floating arm 96 which actuates links 97, a pair of which is secured by pivots 99 to the upstanding ends of a channel-shaped brace 98 attached to the spaced reinforcing members 89. The arms 94 are secured to the shaft 90 on which the arms 96 are freely pivoted to operate the links 97 for raising the thigh section.

The nut mechanism 100 actuates a slide and rack bar 101 to rotate a sector 102 which drives a shaft 103 supported on a pair of bearings 81 attached to the girder member 22. A pair of arms 104 is secured to the shaft 103, having inwardly directed flanges 105 which engage arms 106 which are freely pivotable on the shaft 103. Pivots 107 connect the end of the arms 106 to links 108 which are secured by pivots 109 to each side of the upstanding ends of a channel-shaped brace 111 which is secured to the central spaced reinforcing elements 112 of the leg section 35 of the platform. The movement of the nut 52 of the nut mechanism 100 along the lead screw section 44 shifts the rack 101 to rotate the sector 102 and operate the links 108, for angularly adjusting the leg section 35 of the platform. All of the adjustment of the platform sections may be made independently or simultaneously of each other at any vertically adjusted position thereof.

The raising and lowering of the platform occurs through the raising and lowering of the outer tubular elements 115 of the four corner posts of the supporting structure for the bed. The outer tubular elements are moved upwardly and downwardly over the inner tubular elements 116, the tubular elements being substantially square in section, as illustrated in FIG. 14. Low friction blocks 117 of angular shape are illustrated as placed at each of the corners between the tubular elements. The blocks are preferably secured to the outer tubular elements in position to slide on the surface of the corners of the inner tubular element. These blocks may be made from a low friction plastic material, sintered bearing material or low friction bearing material of any type known in the art to be suitable. The inner tubular element 116 supports the caster 118 at the bottom end in the conventional manner. As illustrated in FIGS. 5 and 8, a coil spring 119 is secured to the top element 121 of the outer tubular element 115, the opposite end being hooked over a pin 122 secured to the upper end of the caster. Between the inner and outer surfaces of tubular elements, one end portion of four cables is secured in any suitable manner, herein illustrated by a tubular encased end 120.

A sheave 124 is secured to the outer tubular elements near the bottom thereof, retained within the cross member 24 and straddling a slot 125 in the lower portion of the outer tubular element 115. The cable 123 in the tubular element at one side of the footboard extends outwardly thereof through the slot and beneath the sheave 124 across the girder member 22 and about a sheave 126 on the far side of the girder member. The cable 127 in the tubular element on the opposite side of the footboard extends across the girder member 22 and about a sheave 128 on the far side of the member. The cables 123 and 127 extend forwardly to the headboard and about a pair of sheaves 129 and 131 and are secured to the interconnecting pair of arms 132 of the pair of nuts 51 at the head end of the lead screw. The sheaves 129 and 136 and sheaves 131 and 135 (FIG. 13) are supported in pairs of brackets 137. A pair of cables 133 and 134 extend from between the inner and outer tubular elements of the headboard and around sheaves 135 and 136 and are also secured to the arms 132 of the pair of unitized nuts 51. The two nut mechanisms are interconnected by a locking sleeve 138 so that they will be driven in unison and equally assume the load of all four cables. By interconnecting the two nuts 51 for assuring a greater load than the other nuts, the same type of lead screw and nuts can be employed for operating all moving parts of the bed. The unitized pair of nuts 51 actuate limit switches 50 at each end of their travel on the lead screw section 47 to de-energize the solenoids thereof. By simultaneously energizing the solenoids of the unitized nuts 51, they will be driven along the lead screw section 47 to raise or lower the outer tubular elements 115 on the inner tubular elements 116 to raise the box section girder member 22 along therewith, thereby raising and lowering the platform independently of any position which the platform sections may be in. Before or after the platform is raised, the sections thereof may be adjusted to any angular relation to each other so that there is no interference in the adjustment either angularly or in the raising or lowering movements of the platform and the various sections thereof.

A control mechanism (not illustrated) may be provided for the occupant of the bed, one element of which controls the energization of the motor in forward or reverse direction, others of which control the energization of the nut mechanisms for tilting the head section, the thigh section, the leg section of the platform, and for raising or lowering all of the platform sections relative to the floor. The construction is simple, positive, rugged and economical of manufacture and maintenance and free of all projections so that the nurses, doctors or any other person may move about the bed without hindrance along both sides thereof.

At each end of the bolster 26, and mounted for swinging movement between a guard position at the side of the body-receiving platform and a storage position beneath the platform, is a safety-side frame structure 141 (FIGURES 1, 4, 15 and 17). Each of the safety-sides comprises an upper section 140 and a lower section 143 pivoted together on an axis extending longitudinally of the bed, the safety-side as a whole being pivoted to a pair of mounting plates 151 secured to opposing flanges 152 of a cross plate 153, screwed, as at 142, to the bottom wall of the bolster 26.

The lower section 143 of the safety-side comprises a pair of spaced L-shaped arms 145 joined at their upper ends by an integral cross-member 150 and pivoted at their lower extremities by means of bolts 144 to the mounting plates 151 at outwardly embossed bearing surfaces 160. Ears 170 struck outwardly from the front edge of the plates 151 engage the L-shaped arms 145 to limit their upward swinging movement at the guard position.

The safety-side is maintained in the guard position by pins 158 which extend inwardly from the L-shaped arms 145 and are supported upon the notched upper ends 157 of levers 155 which are pivoted at 154 to the outside walls of the mounting plates 151 intermediate each plate and its associated L-shaped arm 145. The levers 155 are connected together by a rod 156 and are normally urged to upstanding position by a tension spring 173 connected between the rod 156 and a cradle rod 168, still to be described. When it is desired to drop the safety-side to the storage position, the levers 155 are released by grasping the rod 156 with one hand and pulling it outwardly against the force of the spring 173 to disengage the levers 155 from the pins 158, while supporting the safety-side with the other hand.

The upper section 140 of the safety-side includes the guard panel proper, an oval-shaped tubular frame member 148 with a medial filler tube 149, which is secured by welding to an inverted U-shaped frame 180, the downwardly directed legs 146 of which are pivoted by shoulder bolts 147 to the upper ends of the L-shaped legs 145 of the lower section 143.

A releasable latch 181 pivoted on each L-shaped arm 145 of the lower section 143 engages a pin 167 projecting inwardly from the inner surface of each downwardly extending leg 146 of the upper section to lock the upper section in upright position upon the lower, the L-shaped arms 145 having notches 166 to receive the pins 167. A leaf spring 172 urges the latch toward the locking position, and the nose 182 of the latch is rounded so that it may be cammed upwardly to seat the pin to lock the upper and lower sections of the safety-side together.

The latches 181 may be disengaged manually, but provision is also made to open the latches automatically by means of camming members 159, one of which is slidably disposed along the inner surface of each L-shaped leg 145. The camming member 159 is itself of conforming L-shape and includes an upright arm 164, the upper end 165 of which is disposed to engage the lower edge of the latch 181, and a horizontally disposed finger 161 which extends inwardly to a position adjacent the forward edge of the mounting plate 151.

Each of the L-shaped camming members 159 is slidably mounted on one of the legs 145 of the lower section by a pair of pins 163 which project inwardly from the inner faces of the legs and which ride in a pair of slots 183 and 162 in the camming member, the slot 183 being vertically disposed adjacent the upper end of the upright portion 164 of the camming member, and the slot 162 being located adjacent the intersection of the upright arm and the finger 159. The slot 162 is outwardly and upwardly sloped so that outward movement of the finger 161 will cause the upright portion 164 of the member to move upwardly to lift the latch 181 from the locking pin 167.

Disengaging movement of the L-shaped camming member 159 may be accomplished by engagement of the finger 161 thereof with the forward edge of the supporting plate 151 to urge the member forwardly as the safety-side structure is being lowered, and may be caused by any convenient interference between the finger 161 and the forward edge of the plate 151 as, for example, by a pin projecting from the inner surface of the finger of each member or by a thickened or offset portion at the end of the finger.

The safety-side frame structure is maintained in the storage position by the cradle rod 168 pivoted at its ends 171 in the mounting plates 151 and formed so as to provide a cradle engageable with the horizontal cross member 149 of the guard panel. The cradle rod 168 includes a downwardly and rearwardly inclined support portion 185 a horizontal base portion 186 upon which the cross member 149 of the panel may rest, and a connecting portion 187 extending between the support portions. The connecting portion 187 is bent into an inverted V-shape and cooperates with depending ears 170 on the mounting plate 151 to maintain the panel within the cradle.

Removal of the safety-side from the storage position is accomplished merely by manually swinging the cradle 168 rearwardly to free the cross member 149 of the panel, and swinging the safety-side about its pivots 144 and 147 until the pins 158 of the lower section are reseated in the notched ends 157 of the retaining lever 155, and the latches 181 reengage the pins 167 of the upper section 140.

It will be seen that the frame is carried at each side of the bed beneath the bolster portion thereof by which it is supported, completely out of interference with anyone moving along the sides of the bed. It requires only the rearward swinging of the cradle 168 to release the frame and pull it outwardly and upwardly into latched position at one or both sides of the bed, as the case may be, when it is desired to use one or both of the frames. Heretofore, frames for a bed were separate elements stored at a point remote from the room which the bed occupied and were usually not available when needed. The frames of the present invention are always available as part of the bed and when in collapsed position are completely below the platform thereof.

Referring to FIG. 16, a further form of the invention is illustrated, wherein the box section girder member 22 has the links 84 disposed therewithin. In this arrangement, a sector 174 is freely pivoted on the shaft 74 between washers 175 which are secured to the shaft. A finger 176 extends outwardly from the sector 72 in a position to engage one of the arms 177 which are welded to the shaft to produce the operation of the links 84 and raise or lower a platform section. In this particular arrangement, the sector has an extending arm 178 which supports a rod 179 having the rollers 87 on the ends for initially raising the platform, as explained above. The links are disposed within the box section girder member 22 to reduce the hazards of injuring a person when the bed is operated. By having a sector freely pivoted on the shaft 74, the positive drive between the sector and shaft 74 is eliminated which minimizes the possibility of any injury occurring through the operating mechanism when disposed within the girder member. It is to be understood that the links and operating structure elements for all of the sectors may be disposed within the girder member, with all sectors freely swingable on their respective shafts.

What is claimed is:

1. An adjustable bed having a plurality of body-supporting sections which are relatively movable to different supporting positions, an underframe carrying said sections and comprising an elongated girder structure extending longitudinally of the bed beneath said sections and having a width less than that of said sections and arms carried by said girder structure intermediate the ends of the bed to extend the underframe sidewardly from the girder strucucture, floor-engaging means secured to the underframe to support the bed upon a floor, at least one of said sections being pivoted to said arms on an axis transverse to said girder structure, and means connected between said sections and said underframe for maintaining said sections in any of said different positions.

2. An adjustable bed having a plurality of body-supporting sections which are relatively movable to place said sections in different supporting positions, an underframe carrying said sections and comprising an elongated girder structure extending longitudinally of the bed beneath said sections and having a width less than that of said sections, and a cross member carried by said girder structure intermediate the ends of said bed to extend the underframe sidewardly from the girder structure, floor-engaging means secured to the underframe to support the bed upon a floor, at least one of said sections being pivoted to said cross member on an axis transverse to said girder structure, and means connected between said sections and said underframe for maintaining said sections in any of said different positions.

3. An adjustable bed having a plurality of body-supporting sections which are relatively movable to place said sections in different supporting positions, a cruciform underframe carrying said sections and including an elongated central girder structure extending longitudinally of the bed beneath said sections, and a cross-member carried by said girder structure intermediate the ends of said bed to extend the underframe sidewardly from the girder structure, end frames secured to the ends of said girder structure to support the bed upon a floor, two of said sections being pivoted to said cross-member to swing about an axis transverse to said girder structure, and means connected between said sections and said underframe for maintaining said sections in any of said different positions.

4. An adjustable bed having a plurality of body-supporting sections which are relatively movable to place said sections in different positions, an underframe carrying said sections and including an elongated girder structure extending longitudinally of the bed beneath said sections centrally of the bed and a cross-member carried by said girder structure intermediate the ends of said bed to extend the underframe sidewardly from the girder structure, floor engaging means secured to the underframe to support the bed upon a floor, two of said sections being pivoted to said cross-member to swing about an axis transverse to said girder structure, linkage means connected between said girder structure and said two sections for adjusting said sections to any of said different positions, and mechanism within said girder structure for operating said linkage means.

5. An adjustable bed having a plurality of body-supporting sections, an underframe carrying said sections and including a box-like girder structure extending longitudinally of the bed beneath said sections and centrally of the bed, said sections being mounted upon said girder structure with their side edges projecting sidewardly of said girder structure at both sides of the bed, a pair of end frames at the head and foot of the bed respectively, each end frame being connected to said girder structure and having spaced legs to support the bed upon the floor, said legs being extensible from the retractable into said end frames to raise and lower the bed, and elevating mechanism housed within said girder structure and end frames for extending and retracting said legs.

6. An adjustable bed having a plurality of body-supporting sections which are relatively movable to place said sections in different supporting positions, an underframe comprising a box girder structure extending longitudinally of the bed beneath said sections centrally of the bed and having a width less than that of said bed, floor engaging means secured to the underframe to support the bed upon a floor, said sections being carried by said girder structure with at least one of said sections being swingable thereon about an axis transverse to said girder structure, an elevating screw within said box girder structure, and linkage means connecting said screw and said one section for adjusting said sections to any of said different positions.

7. An adjustable bed having a plurality of body-supporting sections which are relatively movable to place said sections in different supporting positions, an underframe carrying said sections and including an elongated box girder structure extending longitudinally of the bed beneath said sections centrally of said bed and having a width less than that of said bed, at least one of said sections being pivoted to said underframe to swing on an axis transverse to said girder structure, an end frame at each end of the bed secured to said girder structure, said end frames each having a pair of spaced legs extensible from and retractable into said end frames to raise and lower the bed, a lead screw in said box girder having at least two selectively operable nuts spaced therealong, one such nut being connected through linkage with said one bed section and the other by means of sheave-directed cables to said legs, a motor for turning said screw, and means for selectively operating said nuts to travel along said screw.

8. In a bed having a body platform and a supporting structure therefor, a safety-side movably mounted on said supporting structure for movement between a guard position at the side of the body platform and a storage position beneath the platform, releasably inter-engageable means on said safety-side and on said supporting structure for maintaining said safety-side in said guard position, said safety-side in guard position having upper and lower sections pivoted together on an axis extending longitudinally of the bed, the lower section being pivotally mounted on the supporting structure on a second longitudinal axis, whereby said two sections when folded together on said first-mentioned axis may be swung beneath the body-receiving platform about said second-mentioned axis, and means on the supporting structure for engaging the folded safety-side to maintain the same in said storage position.

9. In a bed having a body platform and a supporting structure therefor, a safety-side movably mounted on said supporting structure for movement between a guard position at the side of the body platform and a storage position beneath the platform, releasably inter-engageable means on said safety-side and on said supporting structure for maintaining said safety-side in said guard position, said safety-side in guard position having upper and lower sections pivoted together on an axis extending longitudinally of the bed, the lower section being pivotally mounted on the supporting structure on a second longitudinal axis inwardly of and beneath the adjacent side edge of the body platform, whereby said two sections when folded together on said first-mentioned axis may be swung beneath the body platform about the second-mentioned axis, and means on the supporting structure for engaging the folded safety-side to maintain the same in said storage position.

10. In a bed having a body platform and a supporting structure therefor, a safety-side movably mounted on said supporting structure for movement between a guard position at the side of the body platform and a storage position beneath the platform, releasably inter-engageable means on said safety-side and on said supporting structure for maintaining said safety-side in said guard position, said safety-side in guard position having upper and lower sections pivoted together on an axis extending longitudinally of the bed, the lower section being pivotally mounted on the supporting structure on a second longitudinal axis inwardly of and beneath the adjacent side edge of the body platform, whereby said two sections when folded together on said first-mentioned axis may be swung beneath the body platform about the second-mentioned axis into a storage position in which the lower section overlies the upper section, and means on the supporting structure for engaging the upper section to maintain said safety-side in said storage position.

References Cited in the file of this patent
UNITED STATES PATENTS

| | | |
|---|---|---|
| D. 95,410 | Goldberg | Apr. 30, 1935 |
| 897,282 | Freschl | Sept. 1, 1908 |
| 1,076,964 | Dunner | Oct. 28, 1913 |
| 1,280,792 | MacEachern | Oct. 8, 1918 |
| 1,406,737 | Hoy | Feb. 14, 1922 |
| 1,425,718 | Sussman | Aug. 15, 1922 |
| 1,908,530 | Nixon et al. | May 9, 1933 |
| 2,159,883 | Caldwell | May 23, 1939 |
| 2,179,171 | Boho | Nov. 7, 1939 |
| 2,374,488 | Knox | Apr. 24, 1945 |
| 2,452,366 | Freund | Oct. 26, 1948 |
| 2,477,400 | Beem et al. | July 26, 1949 |
| 2,594,926 | Hoffman | Apr. 29, 1952 |
| 2,669,732 | Moon | Feb. 23, 1954 |
| 2,672,917 | Collura | Mar. 23, 1954 |
| 2,681,454 | Tallman | June 22, 1954 |
| 2,722,017 | Burst et al. | Nov. 1, 1955 |
| 2,750,605 | Blevins | June 19, 1956 |
| 2,779,953 | Thompson et al. | Feb. 5, 1957 |
| 2,817,854 | Pratt | Dec. 31, 1957 |
| 2,827,641 | Reichert et al. | Mar. 25, 1958 |
| 2,830,303 | Sandock | Apr. 15, 1958 |
| 2,834,032 | Scott | May 13, 1958 |
| 2,837,751 | McCall | June 10, 1958 |
| 2,857,776 | Williams et al. | Oct. 28, 1958 |
| 2,872,688 | Reichert et al. | Feb. 10, 1959 |
| 2,913,300 | Darnell et al. | Nov. 17, 1959 |
| 2,913,737 | McNabb | Nov. 24, 1959 |
| 2,924,265 | Himka | Feb. 9, 1960 |
| 2,945,395 | Ziskal | July 19, 1960 |